No. 660,594. Patented Oct. 30, 1900.
L. C. SHAMMO.
NUT LOCK.
(Application filed June 5, 1900.)
(No Model.)

Witnesses

Inventor
Luther C. Shammo
By Thos. E. Robertson, Attorney

UNITED STATES PATENT OFFICE.

LUTHER C. SHAMMO, OF HARRISBURG, PENNSYLVANIA.

NUT-LOCK.

SPECIFICATION forming part of Letters Patent No. 660,594, dated October 30, 1900.

Application filed June 5, 1900. Serial No. 19,135. (No model.)

*To all whom it may concern:*

Be it known that I, LUTHER C. SHAMMO, a citizen of the United States, residing at Harrisburg, in the county of Dauphin, State of Pennsylvania, have invented a certain new and useful Improvement in Nut-Locks, of which the following is a specification, reference being had to the accompanying drawings.

This improvement relates to that class of nut-locks in which a non-rotatable washer is used to supplement the nut and in which a fastening device is provided to lock the nut to said non-rotatable washer, and thereby prevent its becoming loose; and it is my object to provide a nut-lock which while possessing all the advantages usually possessed by this class of nut-locks will obviate the necessity of springs or screws to hold together the two parts of the lock.

With this object in view my invention consists in the peculiar construction, arrangement, and combination of parts hereinafter described, and definitely claimed.

Figure 1:
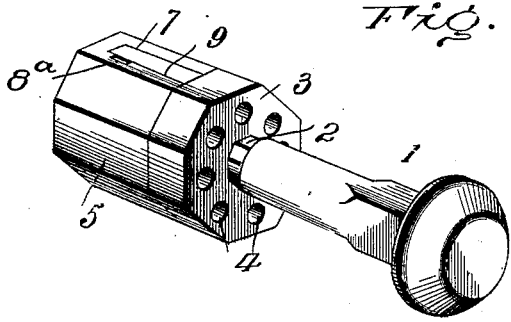
Figure 2:
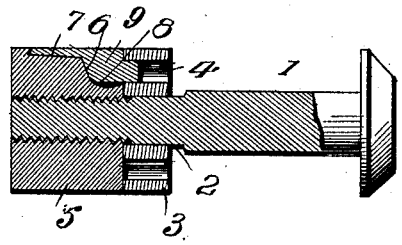
Figure 3:
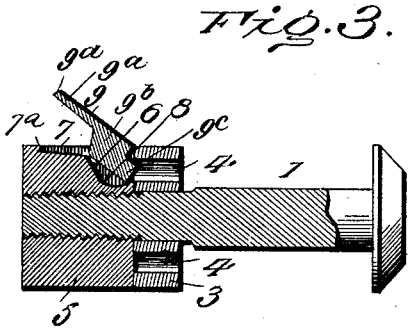
Figure 4:
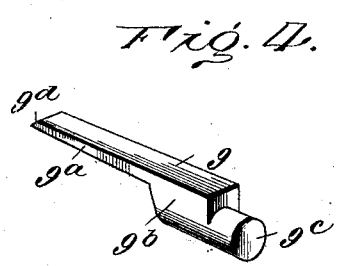

In the accompanying drawings, Figure 1 is a perspective view of my improvement. Fig. 2 is a longitudinal vertical section. Fig. 3 is a similar section showing the manner of attachment of the locking-pin, and Fig. 4 is a detail of the locking-pin.

Referring now to the details of the drawings by numerals, 1 represents the bolt, having the usual head, shank, and screw-threaded end; but between the round part of the shank and said screw-threaded end I provide an eight-sided portion 2. On this octagonal portion 2 is slidingly attached a washer 3, having its central opening of the same shape as said octagonal part 2, so that said washer may have only a sliding motion lengthwise of the bolt and at the same time be incapable of rotary movement thereon. It is obvious that instead of making the bolt with eight sides it may be made with any desired number, or, if preferred, it may be provided with a feather or key to engage a groove in the non-rotatable washer 3. However, I prefer the octagonal shape, as that is nearest the shape of the bolt. This non-rotatable washer is provided with a plurality of adjusting holes or perforations 4, whose use will appear later.

The numeral 5 represents the nut, which is secured by screw-threads to the bolt 1 in the usual manner. This nut 5 is provided with a peculiar opening 6, which forms a seat for a locking-pin 9, the opening 6 comprising a shallow portion 7, with an undercut end $7^a$ and a deep recess 8. The locking-pin 9 is of the peculiar shape shown in Fig. 4 and comprises a comparatively thin member $9^a$ and a main part or body $9^b$, the latter having a lug $9^c$, which is adapted to project into any one of the plurality of openings in the non-rotatable washer 3. The end $9^a$ of this locking-pin 9 is formed with a beveled end, as shown at $9^d$, to fit into the undercut end $7^a$ of the recess 8, and the latter is provided with a groove or opening $8^a$, by means of which a tool may be wedged under the flat portion $9^a$ of the locking-pin 9 and the latter thus disengaged.

In operation the washer 3 is placed on the bolt and the nut 5 screwed home in the usual manner, and when the latter is as tight as it can be made and register with one of the perforations 4 the lug $9^c$ of the locking-pin is pushed through the deep recess 8 in the nut 5 and into the perforation 4, when the other end of the pin can then be forced down into its seat, with its beveled end fitting under the undercut end $7^a$ of said recess. When it is desired to detach the nut, a suitable tool is used, the end of which is caused to enter the groove or opening $8^a$ and wedged under the locking-pin, and the latter thus forced out of its seat.

I am aware that it is old in quite a number of patents to use non-rotatable washers in connection with a nut provided with a screw or pin to engage notches or recesses in the washers—such, for example, as those shown in United States Patents Nos. 283,505 and 523,605—and do not attempt to claim anything shown therein.

What I claim as new is—

1. The combination of a screw-threaded bolt and a washer slidingly secured thereto, the said bolt and washer being so shaped with respect to each other that the washer will not rotate on the bolt, and the latter having a perforation therein; of a nut threaded on said bolt and having a recess in one of the sides thereof, and a locking-pin adapted to enter said recess and having a lug arranged to enter the perforation in the aforesaid washer, substantially as described.

2. The combination with a screw-threaded bolt provided with a non-rotatable washer slidingly secured thereto, the washer having a perforation therein; of a nut threaded on said bolt and having a recess in one of the sides thereof, a locking-pin adapted to enter said recess and having a lug arranged to enter the perforation in the aforesaid washer, the end of the recess being undercut and the end of the locking-pin shaped to engage with said undercut recess, substantially as described.

3. The combination with a screw-threaded bolt provided with a non-rotatable washer slidingly secured thereto, the washer having a plurality of perforations therein; of a nut threaded on said bolt and having a recess in one of the sides thereof, a locking-pin adapted to enter said recess and having a lug arranged to enter any of the perforations in the aforesaid washer, the end of the recess being undercut and the end of the locking-pin shaped to engage with said undercut recess, and a groove or opening by which the pin may be wedged off, substantially as described.

In testimony whereof I affix my signature, in the presence of two witnesses, this 31st day of May, 1900.

LUTHER C. SHAMMO.

Witnesses:
FREDERICK M. OTT,
FORREST L. YODER.